(12) United States Patent
Chen et al.

(10) Patent No.: US 11,182,272 B2
(45) Date of Patent: Nov. 23, 2021

(54) APPLICATION STATE MONITORING

(71) Applicant: International Business Machines Corporation, Armonk, NY (US)

(72) Inventors: Zheng Chen, Shanghai (CN); Jinsong Ji, Ponte Vedra, FL (US); Ke Wen Lin, Shanghai (CN); Qing Shan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/955,160

(22) Filed: Apr. 17, 2018

(65) Prior Publication Data

US 2019/0317877 A1  Oct. 17, 2019

(51) Int. Cl.
*G06F 11/36* (2006.01)
*G06F 8/41* (2018.01)

(52) U.S. Cl.
CPC ............. *G06F 11/364* (2013.01); *G06F 8/44* (2013.01)

(58) Field of Classification Search
CPC ................................ G06F 11/364; G06F 8/44
USPC ....................................................... 717/128
See application file for complete search history.

(56) References Cited

U.S. PATENT DOCUMENTS

| | | | | |
|---|---|---|---|---|
| 5,911,073 A * | 6/1999 | Mattson, Jr. | ............... | G06F 8/20 717/104 |
| 6,631,518 B1 | 10/2003 | Bortnikov et al. | | |
| 7,565,645 B2 * | 7/2009 | Barrs | ................... | G06F 11/3636 717/130 |
| 7,908,020 B2 * | 3/2011 | Pieronek | ............... | G05B 19/042 700/19 |
| 8,726,225 B2 | 5/2014 | Shu et al. | | |
| 9,459,990 B2 | 10/2016 | Ligman et al. | | |
| 10,353,678 B1 * | 7/2019 | Wagner | .................... | G06F 9/548 |
| 2006/0212861 A1 * | 9/2006 | Tarditi, Jr. | ............... | G06F 8/437 717/146 |
| 2008/0243970 A1 * | 10/2008 | Schmelter | ........... | G06F 12/0253 |
| 2009/0007065 A1 * | 1/2009 | Becker | .................... | G06F 8/443 717/110 |
| 2010/0313186 A1 * | 12/2010 | Chiodo | ............... | G06F 11/3624 717/131 |
| 2011/0016460 A1 | 1/2011 | Archambault et al. | | |
| 2012/0151461 A1 * | 6/2012 | Odaira | .................... | G06F 8/434 717/156 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Chat C Do
*Assistant Examiner* — Bradford F Wheaton
(74) *Attorney, Agent, or Firm* — Robert J. Shatto

(57) ABSTRACT

Embodiments of the present disclosure relate to methods, systems, and computer program products for monitoring a state of an application. A target object that is to be monitored in an application may be determined in response to receiving a monitoring configuration. A position of the target object in source codes of the application may be identified. A state of the target object may be monitored in response to the application being traced to a location corresponding to the position.

9 Claims, 9 Drawing Sheets

(56) References Cited

U.S. PATENT DOCUMENTS

| | | | |
|---|---|---|---|
| 2013/0238768 A1* | 9/2013 | Vaidya | H04L 67/14 |
| | | | 709/220 |
| 2014/0282388 A1* | 9/2014 | Malkin | G06F 11/3636 |
| | | | 717/113 |
| 2015/0178057 A1* | 6/2015 | Miadowicz | G06F 8/443 |
| | | | 717/151 |
| 2016/0048446 A1* | 2/2016 | Kumar | G06F 11/3476 |
| | | | 717/128 |
| 2016/0248642 A1 | 8/2016 | Rajasekar | |
| 2016/0291942 A1* | 10/2016 | Hutchison | G06F 8/451 |
| 2016/0301561 A1 | 10/2016 | Petersen et al. | |
| 2017/0351573 A1* | 12/2017 | Ueda | G06F 11/0751 |
| 2017/0372068 A1* | 12/2017 | Zimmerman | G06F 21/563 |
| 2018/0143950 A1* | 5/2018 | al-Arnaouti | G06F 17/2235 |
| 2018/0232297 A1* | 8/2018 | Fan | G06F 11/3624 |
| 2019/0034316 A1* | 1/2019 | Levit-Gurevich | |
| | | | G06F 11/3024 |

OTHER PUBLICATIONS

Veitch et al., "XRay: A Function Call Tracing System," Runtime Logging and Support Library, https://storage.googleapis.com/xray-downloads/whitepaper/XRayAFunctionCallTracingSystem.pdf, Apr. 5, 2016, pp. 1-9.

* cited by examiner

```
 1  #define FLAG 0
 2  extern int * p;
 3  extern int global;
 4  int func1() {
 5    int var1 = 1;
 6    int var2 = 2;
 7    int var3 = 3;
 8    int var4 = 4;
 9
10    if (FLAG)
11      var1 += var2;
12    else
13      var3 += var4;
14
15    int t = func2(&var1, global);
16    func3(&var1);
17    p = t;
18    return 0;
19  }
20
21  int func2(int *num, int n) {
22    //nothing to do with num
23    return n + 1;
24  }
```
410

```
 1  #define FLAG 0
 2  extern int * p;
 3  extern int global;
 4  int func1() {
 5    int var1 = 1;
 6    printf("t.c after line 5 var1 %d\n", var1);
 7    int var2 = 2;
 8    int var3 = 3;
 9    int var4 = 4;
10
11    if (FLAG)
12      var1 += var2;
13    else
14      var3 += var4;
15    printf("t.c after line 12 var1 %d\n", var1);
16
17    int t = func2(&var1, global);
18    printf("t.c after line 17 var1 %d\n", var1);
19    func3(&var1);
20    printf("t.c after line 19 var1 %d\n", var1);
21    p = t;
22    return 0;
23  }
24
25  int func2(int *num, int n) {
26    //nothing to do with num
27    return n + 1;
28  }
```
420A — 422A, 424A, 426A, 428A

FIG. 4A

```
 1  #define FLAG 0
 2  extern int * p;
 3  extern int global;
 4  int func1() {
 5    int var1 = 1;
 6    int var2 = 2;
 7    int var3 = 3;
 8    int var4 = 4;
 9
10    if (FLAG)
11      var1 += var2;
12    else
13      var3 += var4;
14
15    int t = func2(&var1, global);
16    func3(&var1);
17    p = t;
18    return 0;
19  }
20
21  int func2(int *num, int n) {
22    //nothing to do with num
23    return n + 1;
24  }
```
410 — 422B, 426B, 428B

FIG. 4B

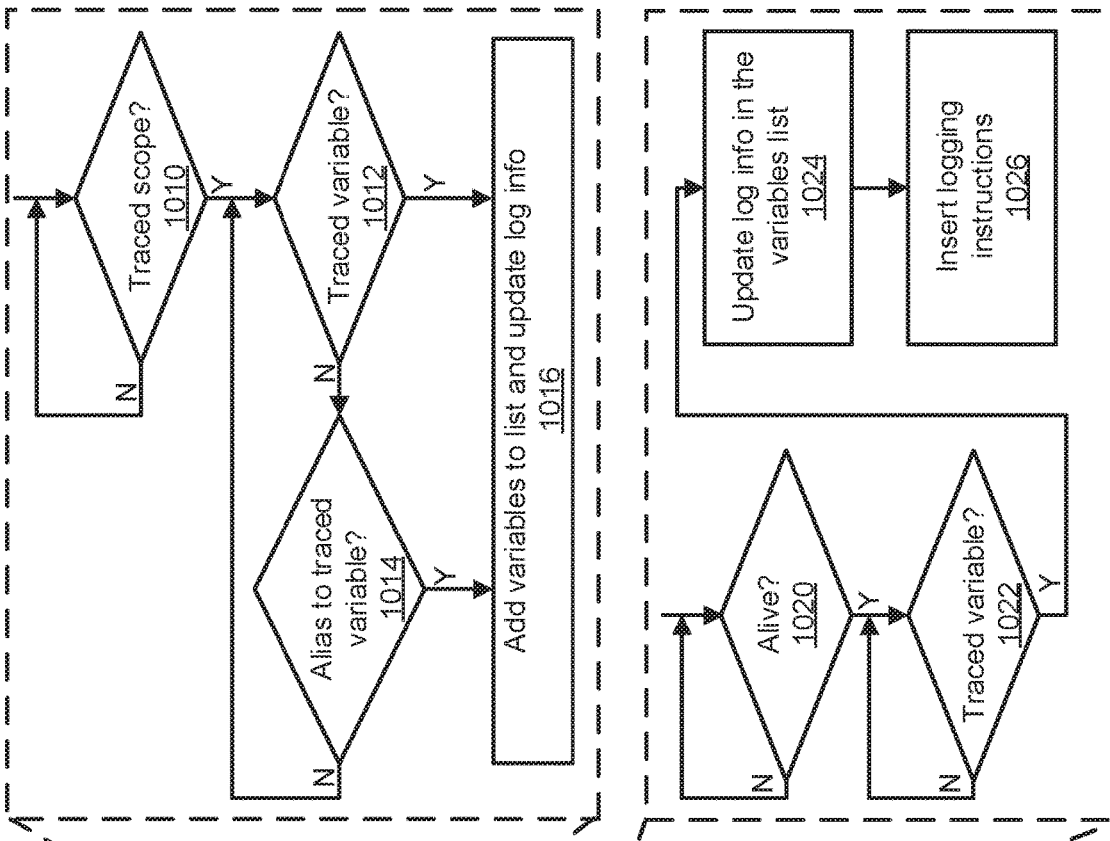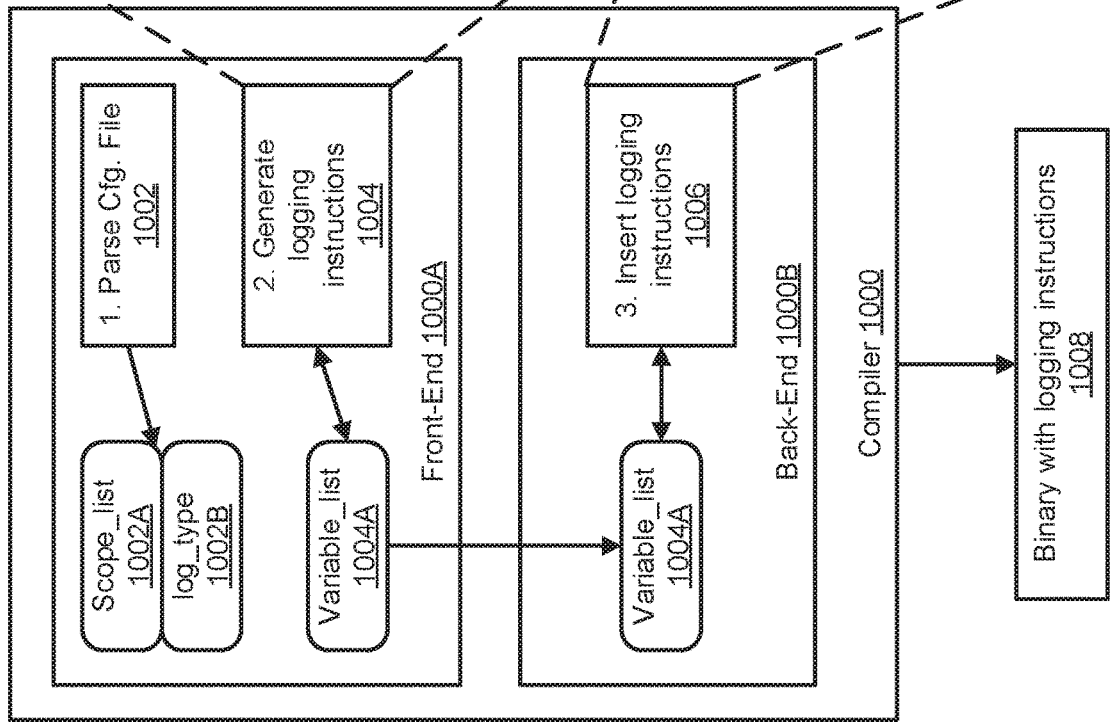
FIG. 10

APPLICATION STATE MONITORING

BACKGROUND

The present disclosure generally relates to software development. Specifically, the present disclosure relates to computer-implemented methods, systems, and computer program products for monitoring an application state in a debugging environment.

In software development, before an application is released, debugging work is essential to trace states of the running application and provide information to engineers for eliminating bugs. The function of the application becomes increasingly complex, and the engineers usually perform lots of manual work in the debugging procedure. Several debugging tools exist for facilitating the manual work.

SUMMARY

Embodiments of the present invention disclose a computer-implemented method, computer program product, and system for automatically monitoring objects in an application. In embodiments, a target object that is to be monitored in an application may be determined in response to receiving a monitoring configuration. The target object may be determined using the received monitoring configuration. A position of the target object in source codes of the application may be identified. A state of the target object may be monitored in response to the application being traced to a location corresponding to the identified position.

The above summary is not intended to describe each illustrated embodiment or every implementation of the present disclosure.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

FIG. 4A depicts an example diagram for monitoring a state of an application, in accordance with embodiments of the present disclosure.

FIG. 4B depicts another example diagram for monitoring a state of an application, in accordance with embodiments of the present disclosure.

FIG. 10 depicts an example block diagram for automatically generating and inserting logging instructions into source code using a compiler, in accordance with embodiments of the present disclosure.

Figure 1:
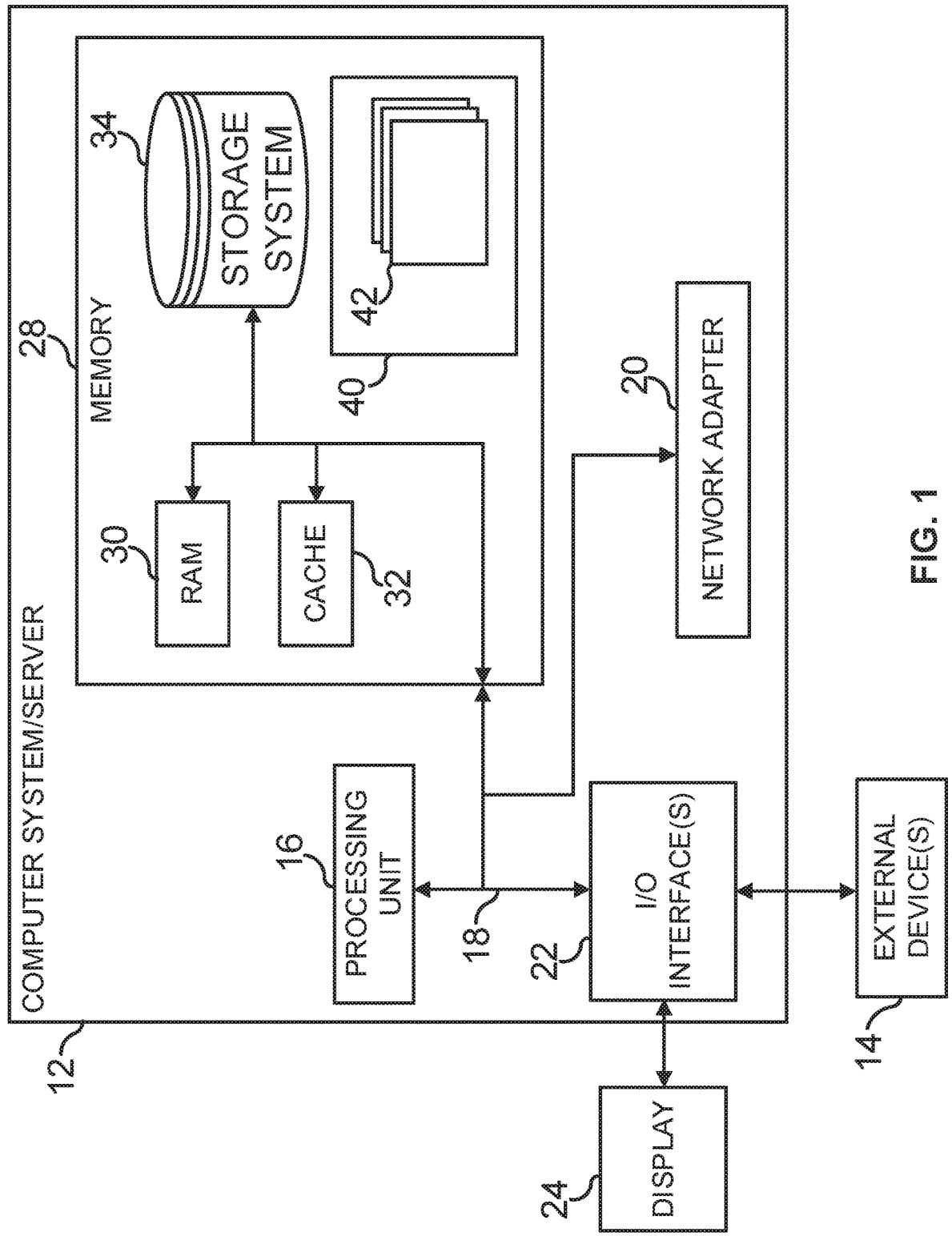
FIG. 1 depicts a cloud computing node according to an embodiment of the present invention.

While the embodiments described herein are amenable to various modifications and alternative forms, specifics thereof have been shown by way of example in the drawings and will be described in detail. Throughout the drawings, same or similar reference numerals represent the same or similar elements. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
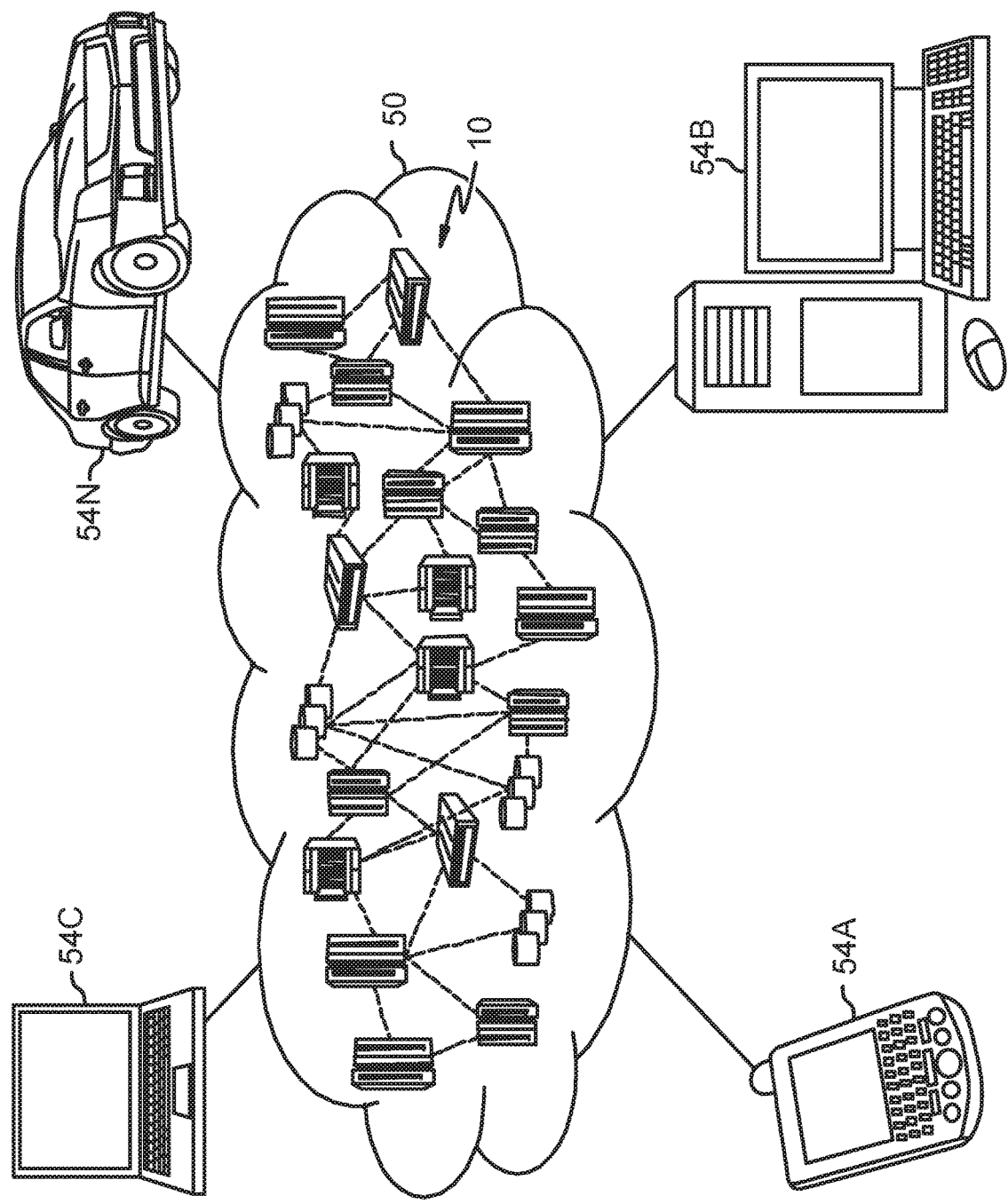
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
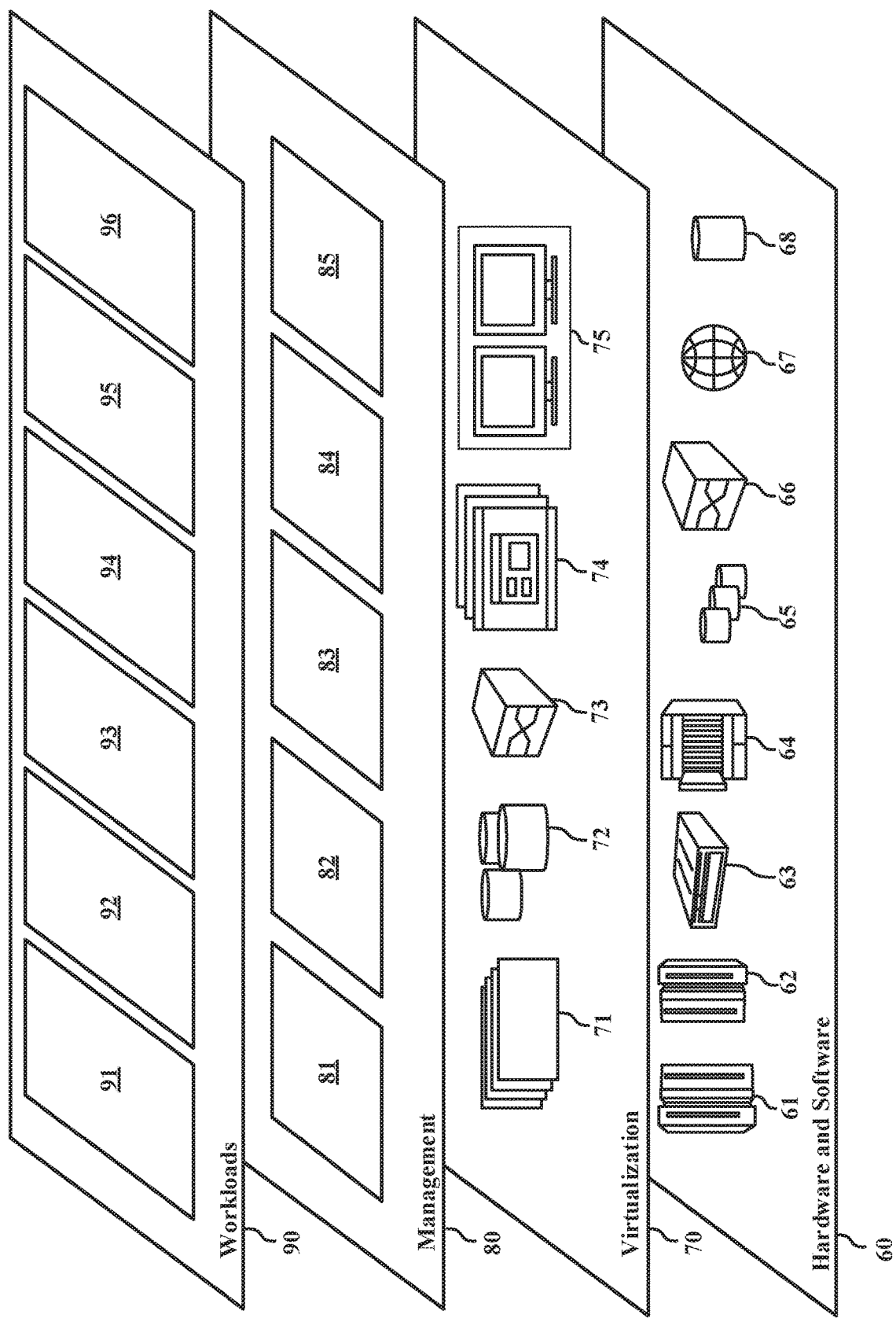
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring processing 96. Hereinafter, reference will be made to FIG. 4B to FIG. 9 to describe details of the monitoring processing 96.

In software development, various solutions are provided for monitoring the state of the application in the debugging environment. As the application becomes increasingly complex, the application may include tens of or even more functions/procedures. In order to ensure that each and every one among these functions/procedures works as desired, the engineer must trace the data flows of the source codes of the application and look for potential errors in the debugging procedure.

Traditionally, the engineer may monitor the state of the application (such as the values of the variables defined in the code of the application) by inserting PRINT commands into the source codes of the application. FIG. 4A depicts an example diagram 400A for monitoring a state of an application according to this technical solution. In order to test source codes 410 of the application, the engineer has to manually determine the position(s) at which the PRINT command(s) may be inserted. As illustrated in FIG. 4A, the engineer may insert PRINT commands at positions 422A, 424A, 426A, and 428A, respectively. After the inserting procedure, a modified source codes 420A may be generated. As these PRINT commands are just for facilitating the debugging procedure, once the debugging procedure is completed, the engineer has to manually remove the inserted PRINT commands from the modified source codes 420A.

Alternatively, debugging tools are provided for facilitating the debugging procedure in another technical solution. Here, the debugging tools may facilitate the engineers to insert check point(s) into the source codes so as to monitor the state of the application at the check point(s). Although it is not required to remove the check point(s) in the debugging tools, the engineer still needs to manually decide where to insert the check point(s).

Based on the above, it requires manual work to monitor the application state in the debugging procedure. Usually, in order to obtain a whole picture of the application, engineers prefer to add a lot of PRINT commands/check points to monitor the application at different time points. This may be a time-consuming work and in turn results in a relatively low performance in the debugging procedure. On the other hand, even if the engineers add as many PRINT commands/check points as they can, there may be a potential risk that they miss one or more important positions at which an error is caused in the application. Therefore, it is challenging to monitor the application state in the debugging environment.

In order to at least partially solve the above and other potential problems, a new method for monitoring the state of the application is disclosed according to embodiments of the present disclosure. For the sake of description, embodiments of the present disclosure will be described by taking an application that is written in C++/C language as an example. However, it is to be understood that embodiments of the present disclosure may be applied to monitoring the state of another application that is written in other programming languages (such as Java language or other languages).

Referring now to FIG. 4B depicted is an example diagram 400B for monitoring a state of an application according to embodiments of the present disclosure. In this embodiment, once the target object that is to be monitored is determined, the one or more positions of the target object that may be used to detect a potential error in the application may be identified automatically.

Supposing the variable "var1" defined in line 5 of the source codes 410 is the target object, multiple positions (such as lines 5, 15 and 16, indicated by positions 422B, 426B, and 428B, respectively) may be identified. Compared with FIG. 4A, as the line 11 will never be called, fewer positions may be considered as being associated with a potential error. Then values of the variable "var1" at the time point when the application is traced to the positions 422B, 426B and 428B may be monitored. With this embodiment of the present disclosure, the engineer does not need to read the source codes line by line to find the position and manually insert the PRINT command at the found position.

Figure 5A:
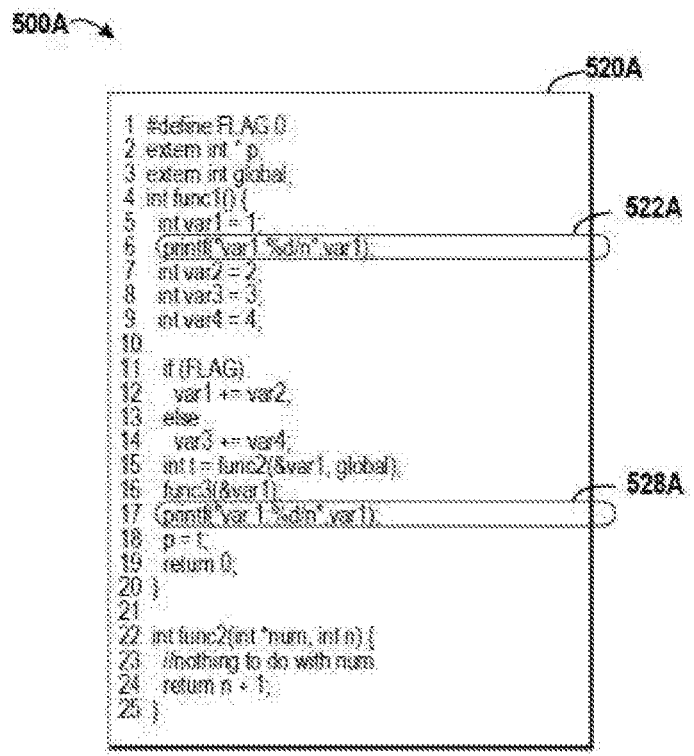
FIG. 5A depicts another example diagram for monitoring a state of an application, in accordance with embodiments of the present disclosure.
Figure 5B:
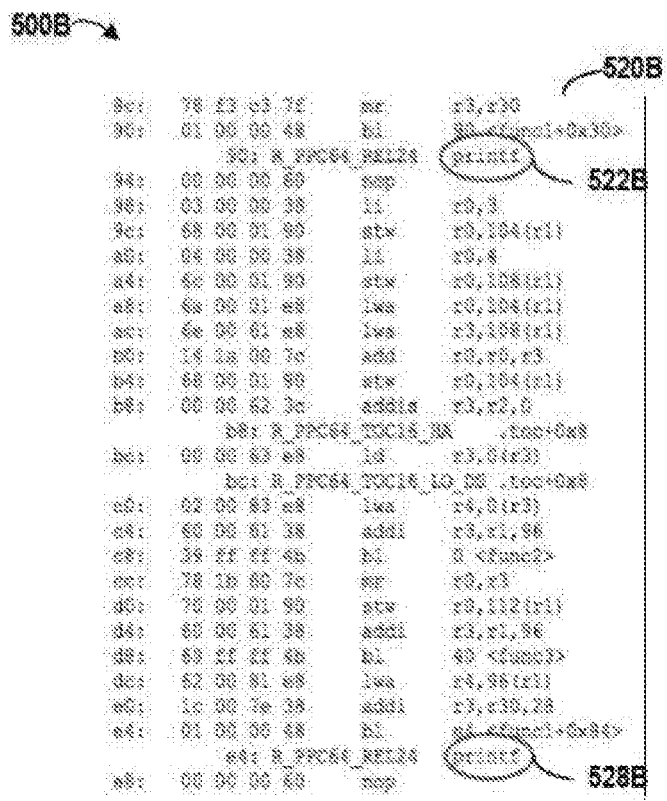
FIG. 5B depicts another example diagram for monitoring a state of an application, in accordance with embodiments of the present disclosure.

It is to be understood that, FIG. 4B is just an example illustration where three positions are identified, and the positions may further be reduced according to other embodiments of the present disclosure. In another example, the positions 422B and 428B may be identified. FIGS. 5A and 5B depict example diagrams for monitoring the states of the target objects at the identified positions.

In some embodiments of the present disclosure, the PRINT commands may be inserted into the source codes, and then the object codes may be generated from the modified source codes for monitoring the state of the target object. As depicted in FIG. 5A, reference numbers 522A and 528A indicate the PRINT commands for monitoring the variable "var1" when the application is traced to the identified positions 422B and 428B in FIG. 4B. With the PRINT commands inserted in the original source codes of the application, a modified version 520A of the source codes may be generated for the debugging procedure. At this point, the PRINT commands 522A and 528A are automatically inserted at the identified positions. In this embodiment, the modified version 520A may be then compiled and built in the debugging procedure to detect a potential error. After the debugging procedure is finished, these inserted PRINT command may be removed without any manual work of the engineer.

In some embodiments of the present disclosure, the PRINT commands may be inserted into the object codes directly, and the state of the target object may be monitored at a level of the object codes. As depicted in FIG. 5B, reference numbers 522B and 528B indicate the PRINT commands for monitoring the variable "var1" when the application is traced to locations corresponding to the identified positions 422B and 428B in FIG. 4B. In the example of FIG. 5B, the state is monitored at the level of the assemble language based on the object codes 520B built from the source codes. It is to be understood that the assemble language is just an example of the object codes. In another embodiment, the object codes may be generated in a different format. For simplicity, the object codes 520B just shows a portion of the object codes built from the source codes 410. Although only two "printf" commands are shown in the object codes 520B, more commands may exist in the object codes 520B.

In this embodiment, the PRINT command is inserted into the object codes, and the state may be monitored directly by running the object codes. At this point, no PRINT command is inserted into the source codes and thus the step of removing the inserted commands may be omitted. Further, it is unnecessary to compile the source codes again to build the object codes.

Details of embodiments of the present disclosure will be described with reference to FIG. 6, which depicts an example flowchart 600 for monitoring a state of an application according to embodiments of the present disclosure. In this embodiment, the target object may be determined from a monitoring configuration at a block 610. Here, the monitoring configuration defines various aspects (such as the name of the target object, the monitoring scope within which the target object may be monitored, and the like) related to the to-be-monitored target object.

It is to be understood that the monitoring configuration may be specified according to a predefined format. In one example, the monitoring configuration may be defined in a plain text file, and an identifier of the target object may be recorded in the monitoring configuration. If it is desired to monitor the state of the variable "var1" in the source codes, the plain text file may include a string of "var1". Although the above illustrates an example where the state of only one target object is to be monitored, one or more target objects may be monitored in another embodiment. At this point, the monitoring configuration may include identifiers of more than one target object. For example, the plain text file may include a string of "var1" and a string of "var2".

Alternatively, the format of the monitoring configuration may be defined in an Extensive Markup Language (XML) file. At this point, the XML file may include the following content as shown in Table 1:

TABLE 1

Example of Monitoring Configuration

...
<var name="var1"/>
...

In the above example of Table 1, the parameter "var name" may indicate an identifier of the target object that is to be monitored. In another example, another parameter such as "target" may be defined to indicate the identifier of the target object. When this XML file is parsed, it may be determined that the target object is the variable "var1". Although the above paragraphs illustrate how to determine the target object from the monitoring configuration by taking the plain text file and the XML file as examples, in another embodiment of the present disclosure, other formats may be adopted for defining the monitoring configuration.

In some embodiments of the present disclosure, the monitoring configuration may define other aspects related to monitoring the state of the application. For example, the scope within which the target object is monitored may be defined in the monitoring configuration. At this point, a scope in source codes for monitoring the target object may be determined from the monitoring configuration, and then only the position which belongs to the scope may be identified. Table 2 shows another example of the monitoring configuration, where more aspects related the monitoring are included.

TABLE 2

Example of Monitoring Configuration

<log_type value=all format=structured>
</log_type>
<func name="func1">
<var name= "var1"/>
<func/>
...

In the example of Table 2, "log_type" may indicate the logging string type, and the enumeration for the tag "value" may indicate the state that is to be monitored. In one example, the state may include any of a name, a value, a type, and a function owner of the target object. Here, "value=all" may indicate that all the states of the target object may be monitored, and "value=short" may indicate that only name and value may be monitored. The enumeration for the tag of "format" may indicate the format for outputting the monitored state. In one example, the monitored state may be outputted in a structured file according to a predefined rule, in a XML file, or in a JavaScript Object Notation (JSON) file.

Further, the "func" tag may be defined as one of keywords for traced scope. In some embodiments of the present disclosure, the tag may be set to "func" to indicate that the target object may be monitored within a scope of a function defined in the source codes. In the example of Table 2, the target object may be monitored within the function of "func1", which means that the variable "var1" occurs within the scope of lines 4 to 19 in the source codes 410 in FIG. 7 may be monitored. In the present application, the scope may be classified into various types. A function trace scope may be marked with the function name. Alternatively, a "loop" trace scope may be defined if the tag is set to "loop" for indicating that the target object may be monitored within a scope of a loop. Here, the loop trace scope can be marked with the file name and line number. Alternatively, the tag may be set to "block" for indicating that the target object may be monitored within a lexical scope of a code block. A lexical block trace scope may be marked with the file name and line number. Alternatively, the tag may be set to "var" for indicating that the scope is a specific variable. A single variable trace scope can be marked with function name (such as "func1" in the source codes 410 in FIG. 7) and line number.

Based on the above rules of the monitoring configuration, the configuration in Table 2 shows: the states may be monitored and be outputted into a structured file, the target object may be monitored within the function "func1", the identifier of the target object is "var1". It is to be understood that the above monitoring configuration of Table 2 is just an example for illustration. In another embodiment, the monitoring configuration may include more or less aspects relating to the monitoring.

In another embodiment of the present disclosure, if a portion of the tags are missed in the monitoring configuration or even no configuration file is specified, a default configuration may be used for the monitoring. For example, all the variables that are defined in the source codes may be monitored, and the states may be outputted into an XML file.

In some embodiments of the present disclosure, the monitoring configuration may be parsed (for example, by a parser) for determining all the related aspects of the monitoring. If more than one target object is specified in the monitoring configuration, a list including all the target objects and the related information may be generated. Further, position(s) associated with each of the target objects may be identified and then the state of each of the target object may be monitored when the application is traced to location(s) corresponding to the position(s).

Figure 6:
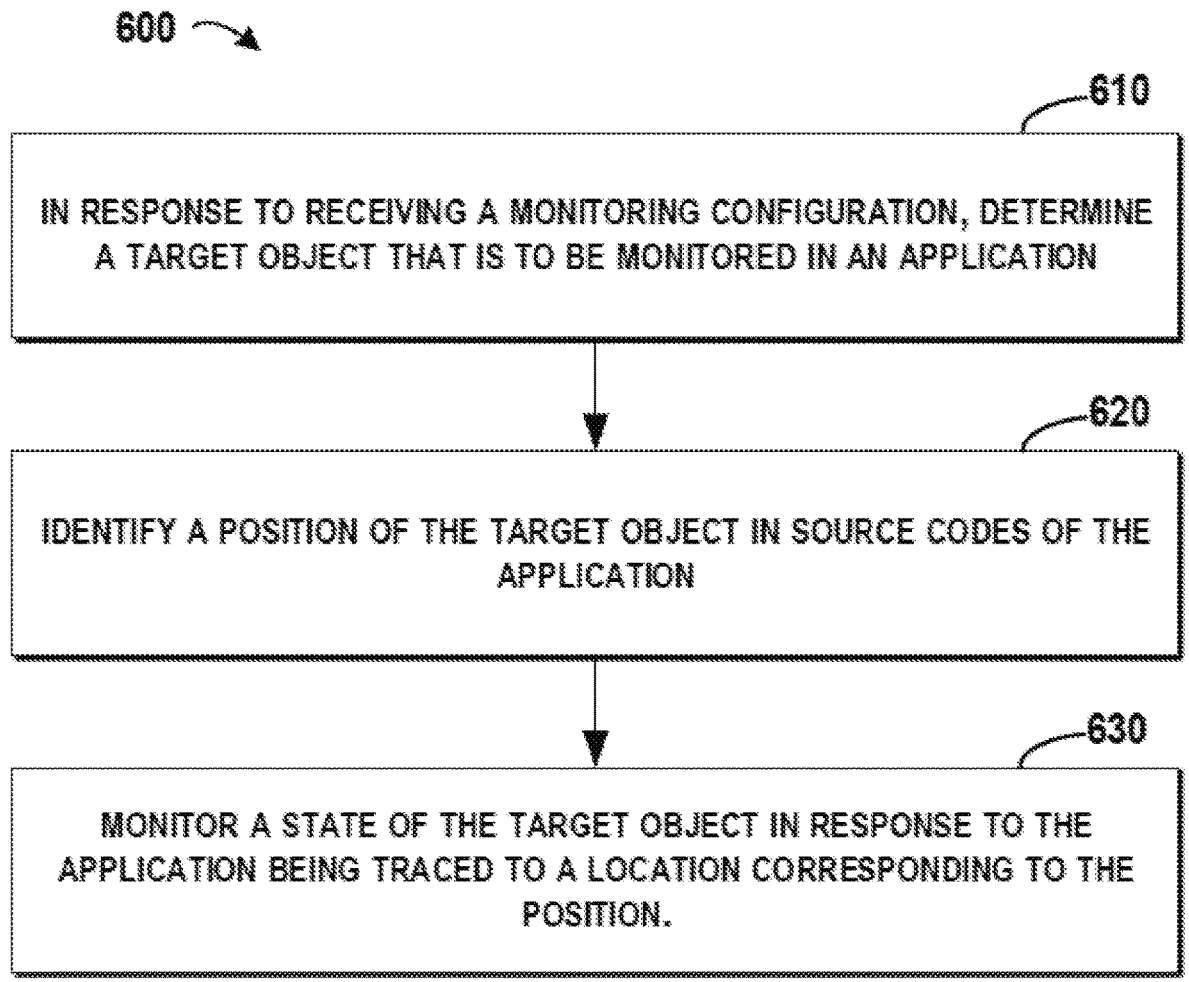
FIG. 6 depicts an example flowchart for monitoring a state of an application, in accordance with embodiments of the present disclosure.

According to the method 600 of FIG. 6, a position of the target object in the source codes of the application may be identified at a block 620. Here, the position may be used to detect a potential error in the application. Generally, when the target object is accessed, the value of the target object may possibly be changed. In a traditional solution, the engineer needs to go through the source codes of the application line by line to find the position where the target object is accessed and then insert PRINT command at the found position. With the present embodiment, the one or more positions for detecting the potential error in the application may be automatically identified.

At a block 630 in FIG. 6, a state of the target object when the application is traced to the position may be monitored. As the identified position may facilitate detecting the potential error of the application, when the application is traced to the location corresponding to the position, the value of the variable "var1" may be monitored. Here, one or more positions may be identified to facilitate the engineer to find the potential error.

Figure 7:
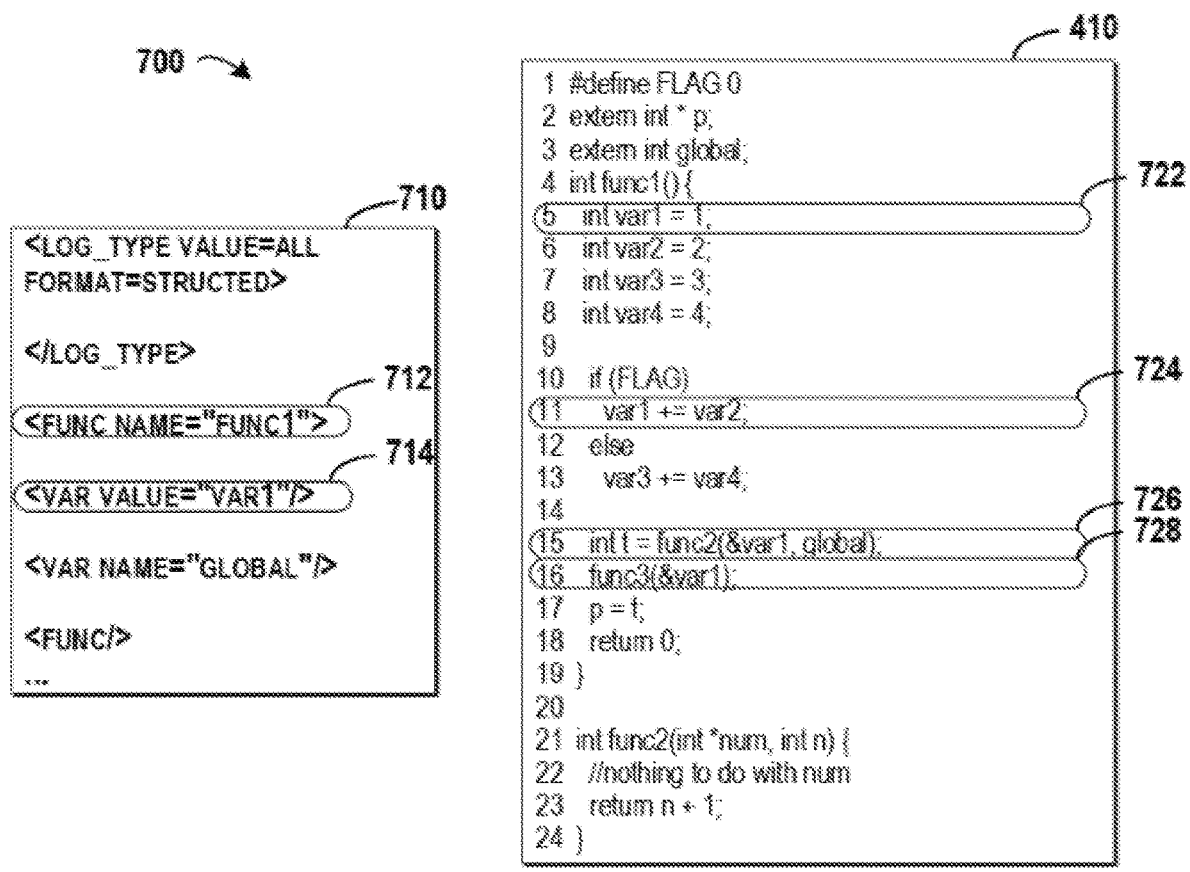
FIG. 7 depicts an example diagram for parsing a monitoring configuration and determining a target object, in accordance with embodiments of the present disclosure.

Reference will be made to FIG. 7 to depict an example diagram 700 for parsing a monitoring configuration and determining a target object according to embodiments of the present disclosure. In FIG. 7, a reference number 710 may indicate a monitoring configuration, where a line 712 may indicate that the monitoring scope is the function "func1", and a line 714 may indicate that the target object is the variable "var1". Referring to the source codes 410 of the application, the variable "var1" is defined in a line 5 in the source code indicated by a position 722. As the "var1=1" sets the value of "var1" to 1, the position 722 may be considered as being associated with a potential error. Similarly, positions 724, 726, 728 may also be identified. For the source codes 410 in FIG. 7, the values of the variable "var1" at the time point when the application is traced to locations corresponding to the positions 722, 724, 726, and 728 may be monitored.

In some embodiments of the present disclosure, a candidate position may be found in the source codes at which an address of the target object being accessed by a request, and then the candidate position may be identified as the position. With this embodiment, the address that is not accessed by the request may not be identified, such that the number of the identified position may be reduced to lower the workload for the monitoring.

In some embodiments, even if the target object occurs in a specific position in the source code, the code line at this position may not be called during the running of the application. At this point, the specific position may not be identified. Referring to the source codes 410 in FIG. 7, lines 10 and 11 record "if (FLAG) var1+=var2". However, as the value of FLAG is set to 0 in line 1 of the source codes 724, the criteria "if (FLAG)" in line 10 will never come true, thereby "var1+=var2" in line 11 will never be called. At this point, the position 724 may not be identified. In this embodiment, the candidate positions may be found by analyzing the source codes 410 based on a workflow of the application. For example, the analysis may be started at the beginning of the monitoring scope. In the example of FIG. 7, the source codes 410 may be analyzed according to workflow of the function "func1( )". In another example, if the monitoring scope is all of the source codes, the analysis may be started at the beginning of the function "main( )".

Sometimes, even if the address of the target object is accessed, the value of the target object may remain unchanged. For example, in the source codes 410, the line 15 indicated by the position 726 shows one situation, where the address of the variable "var1" is accessed, but the value of var1 will not be changed in the func2 which accesses the address of the variable "var1". At this point, the position 726 will not be identified according to an analysis to the workflow of the func2.

In another situation, if the type of the target object cannot be matched with the type of an object accessed by the request, then the position of the target object may not be identified. In order to further reduce the number of the identified positions, the candidate position (such as the position 722, 724) may be identified as the position if a type of the target object is matched with a type of the request. Those positions corresponding to a mismatch may be omitted because the value of the target object will be the same as before. At line 5 of the source codes 410 in the above example, the target object "var1" is defined as an "int" type. If the address of "var1" is accessed by a request which is accessing an object with a "float" type, then a mismatch may occur and the candidate position will be filtered out.

In some embodiments of the present disclosure, the monitored state may be logged to facilitate the engineer to detect the error. Specifically, a logging command may be generated for logging the state of the target object, and then the logging command may be added, at a location that is corresponding to the position in the source codes. Alternatively, a logging command may be added into object codes built from the source codes.

Referring back to FIGS. 5A and 5B, the PRINT commands may be added into the source codes or the object codes as logging commands. In some embodiments of the present disclosure, the logging command may be generated in the language in which the source codes are written and then be inserted into the source codes. In FIG. 5A, two logging commands (lines 6 and 17 indicated by the positions 522A and 528A, respectively) may be generated and inserted to form the modified source codes 520A.

In some embodiments of the present disclosure, the logging command may be generated in the assembly language and then be inserted into the object codes built from the source codes. Referring back to FIG. 5B, two logging commands (at the positions 522B and 528B, respectively) may be generated and inserted to form the modified object codes 520B. At this point, the source codes of the application do not need to be modified. Instead, the logging command is inserted into the object codes that are built from the source codes. Compared with inserting the PRINT command into the source codes, it is not required to recover the source codes to the original version, thereby the workload of the engineer is reduced.

With the logging command, the state of the target object may be logged according to the monitoring configuration. Referring back to Table 2, "format=structured" is specified in the monitoring configuration. At this point, the states of the target object when the application is traced to locations corresponding to the identified positions may be logged in a structured file. It is to be understood that the object codes 520B just shows a portion of the object codes built from the source codes 410. Although only two logging commands are shown in the object codes 520, more logging commands may exist in the object codes 520.

In some embodiments of the present disclosure, it is not required to run the logging command by an individual tool during the debugging procedure. Instead, as the logging command is inserted into the source/object codes of the application at the identified position, when the application is running during the debugging procedure, the logging command may be automatically executed.

In some embodiments of the present disclosure, in order to generate the logging command, a format of the target object may be determined, and then the logging command may log the state of the target object based on the determined format. As the compiler may compile the source codes and build the object codes, an intermediate representation generated by the compiler may be used for determining the format of the target object. Here, the format of the target object refers to the format for logging the state of the target object. In the example of FIG. 7, the target object "var1" is of an "int" type, therefore the format may be defined as an integer. In another example, if the target object is of a "float" type, the format may be defined as a float number.

Figure 8:
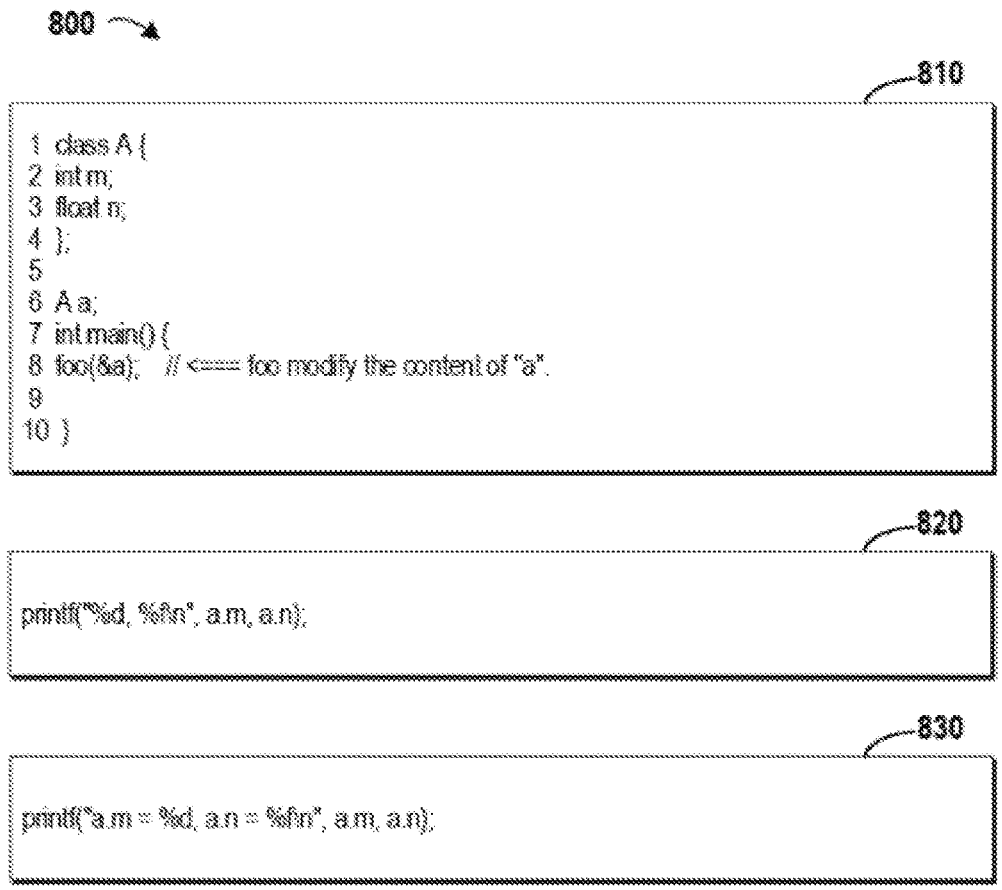
FIG. 8 depicts an example diagram for monitoring a complex variable defined in source codes of an application, in accordance with embodiments of the present disclosure.

The above paragraphs describe the examples of how to monitor the state of the target object with a simple type. In another embodiment, the target object may be defined by a class, a structure, or another complex data structure. FIG. 8 depicts an example diagram 800 for monitoring a complex variable defined in source codes of an application according to embodiments of the present disclosure. A reference number 810 may indicate the source codes of the application, where the class A including a variable "m" with an "int" type and a variable "n" with a "float" type. If the monitoring configuration specifies the variable "a" instantiated from the class A as the target object, then the value of the variable "a" including "a.m" and "a.n" should be monitored.

The source codes 810 includes 10 lines and the address of the target object is accessed by calling "foo(&a)" at line 8. With the method described in the above paragraphs, a position may be identified at line 8 in the source codes 810. It is to be understood that the "printf" command is just for illustrating an example of the logging command, and detailed examples will be described with reference to the logging commands 820 and 830. In some embodiments of the present disclosure, the logging commands 820 and 830 may be inserted after line 8 (at the empty line 9) of the source codes 810. Here, from the intermediate representation outputted by the compiler, the format of the target object "a" may be determined. At this point, first, the variables "a.m" and "a.n" defined in the class A may be determined from the intermediate representation; second, the type of "a.m" and "a.n" may also be determined and in turn "% d"

and "% f" may be adopted for logging the values of the two variables of the target object "a."

In this example, the logging command 820 may be determined as: printf("% d, % f\n", a.m, a.n). Here, the printf command is just an example of a logging command for printing the two variables on the screen, here the values of the two variables is separated by a comma "," as a separator. Assuming a.m=1 and a.m=1.1 when the application is traced to line 9 in the source codes, the state displayed by the logging command 830 may be: "a.m=1, a.n=1.1". In another embodiment, the logging command may further include other readable string to help the engineer to understand the logged state.

In some embodiments of the present disclosure, in order to increase the readability of the logged state, readable strings that may facilitate the engineer to understand the monitored state may be determined based on the intermediate representation. Then, the logging command may be generated based on the readable strings. Referring to FIG. 8, the logging command 830 includes readable strings for helping the engineer to understand the meaning of the state of the variable "a". Assuming a.m=1 and a.n=1.1 when the application is traced to line 9 in the source codes, the state displayed by the logging command 830 may be: a.m=1, a.n=1.1. Compared with the output of the logging command 820, the readable string "a.m=" and "a.n=" may help the engineer to know the relationship between the identifier and the value of the variable.

It is to be understood that the logging commands 820 and 830 are just examples for illustration. In another embodiment, the logging command may include more or less information. For example, for the monitoring configuration defined in Table 2 which includes "value=all", all of the following states of the target object may be logged: a name, a value, a type, and a function owner of the target object. At this point, the logging command may be: printf("name=a.m, value=% d, type=int, owner=main( )\n name=a.n, value=% f, type=float, owner=main( )\n", a.m, a.n). Assuming a.m=1 and a.m=1.1, when the application is traced to line 9 in the source codes, the state displayed by the logging command may be:

name=a.m, value=1, type=int, owner=main( )
name=a.n, value=1.1, type=float, owner=main( )

It is to be understood that the above "printf" is just an example logging commands utilized in the C language. When the source codes are written in another language, the PRINT command may be defined in another way. In another embodiment, the command "cout" may be utilized for the C++ language. At this point, the logging commands 820 and 830 may be rewritten according to definition of the "cout".

In some embodiments of the present disclosure, the logging command written in the assemble language may be inserted into the object codes at a location corresponding to line 9 of the source codes 810. Referring back to FIG. 5B, the logging command may be represented by the assemble language.

Figure 9:
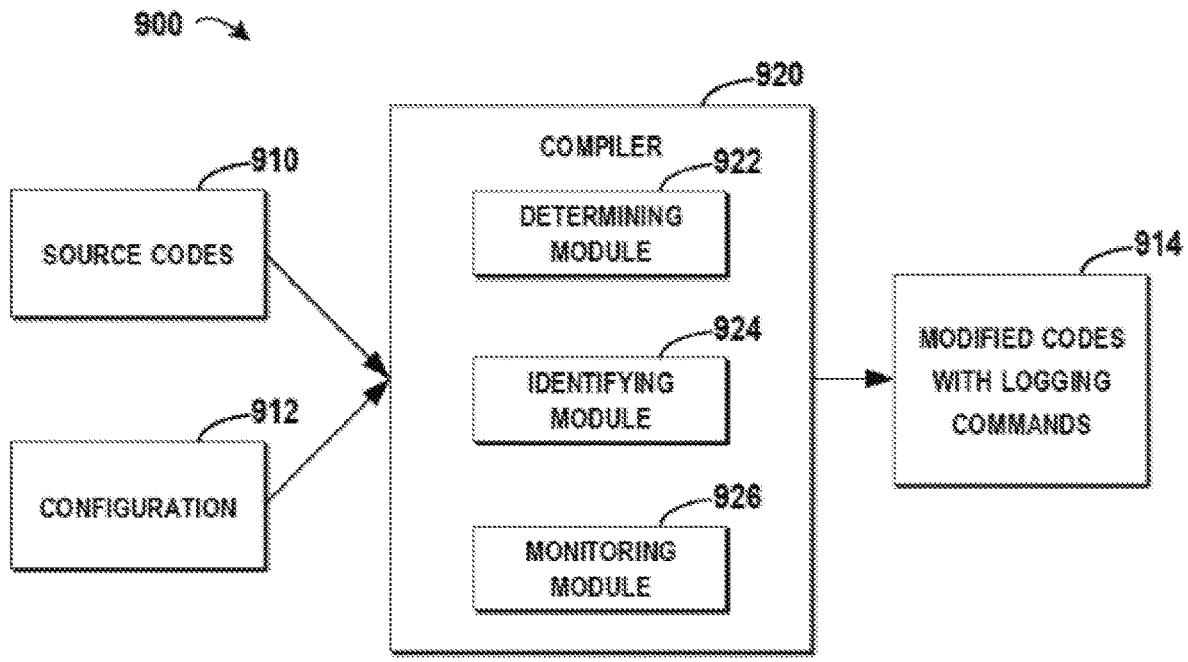
FIG. 9 depicts an example diagram for monitoring a state of an application, in accordance with embodiments of the present disclosure.

In some embodiments of the present disclosure, the method may be implemented in the compiler. FIG. 9 depicts an example diagram 900 for monitoring a state of an application according to some embodiments of the present disclosure. Besides common modules of a traditional compiler, a compiler 920 of the present disclosure may further include modules for implementing the method of the present disclosure.

As depicted in FIG. 9, the functions of a traditional compiler may be modified to implement the present disclosure. Here, the modified compiler 920 may be used for monitoring a state of an application written by source codes 910. Further, a determining module 922 in the modified compiler 920 may determine a target object that is to be monitored in an application in response to receiving a monitoring configuration 912. An identifying module 924 may identify a position in source codes of the application. A monitoring module 926 may monitor a state of the target object when the application is traced to a location corresponding to the identified position.

In the embodiment of FIG. 9, the codes (the source codes 910 or the object codes that are built from the source codes 910) may be inserted with logging commands for monitoring the state, so as to generate the modified codes (with logging commands) 914. When the modified codes 914 is run, the monitored state maybe outputted according to a format that is specified in the monitoring configuration 912.

Referring now to FIG. 10, illustrated is an example block diagram for automatically generating and inserting logging instructions into source code using a compiler 1000, in accordance with embodiments of the present disclosure. The example logging method illustrated in FIG. 10 include three phases: 1) parsing a configuration file (e.g., containing the monitoring configuration) at operation 1002, 2) generating logging instructions at operation 1004, and inserting the generated logging instructions at operation 1006. The first and second phases 1002 and 1004 may be completed in the compiler front-end 1000A, while the third phase 1006 may be completed in the compiler back-end 1000B. Upon completion of the three phases 1002-1006, the compiler may generate an output a binary that contains the logging instructions 1008.

During the first phase 1002, the compiler parses the configuration file to generate a traced scope list 1002A and a set of dumped log info patterns 1002B. As described herein, a trace scope can include, but is not limited to, a function, a loop, a lexical block, or a single variable. The traced scope list 1002A may include one or more trace scope. The set of dumped log info patterns 1002B may include, but is not limited to, information regarding how the compiler 1000 inserts the logging instructions (e.g., the logging format).

During the second phase 1004, the compiler 1000 analyzes the source code and generates a final traced variables list 1004A using the traced scope list 1002A. The compiler 1000 may identify a possible trace scope in the source code at operation 1010. If the compiler 1000 determines that the possible trace scope is not a traced scope, the compiler 1000 may return to operation 1010 and analyze the next possible trace scope in the source code. If the compiler 1000 determines there is a traced scope at operation 1010, the compiler 1000 may determine whether a variable in the trace scope is a traced variable at operation 1012. If the identified variable is a traced variable, the compiler 1000 may add the identified variable to the traced variables list 1004A at operation 1016. If the identified variable is not a traced variable, the compiler 1000 may determine whether the identified variable is an alias to a traced variable at operation 1014. If the identified variable is not an alias to the traced variable, the compiler 1000 may return to operation 1012. The compiler 1000 may repeat this process for all variables in the traced scope. If the identified variable is an alias to a traced variable, the compiler 1000 may add the variable to the traced variables list 1004A at operation 1016.

During the third phase 1006, the compiler 1000 automatically instruments the source code based on the final traced variables list 1004A, the set of dumped log info patterns 1002B, and the compiler's internal knowledge about the source code (e.g., the life-scope, alias, liveness analysis, etc.). For example, the compiler 1000 may determine whether a given variable is alive (e.g., may be potentially read before their next write) at operation 1020. If the variable is not alive, the compiler may check the next variable in the source code. If the variable is alive, the compiler may determine whether the variable is a traced variable at operation 1022. If not, the compiler 1000 may return to operation 1022 and check the next alive variable. Alternatively, operations 1020 and 1022 may be performed sequentially such that after determining that a variable is not a traced variable at operation 1022, the compiler may return to operation 1020 to identify the next alive variable.

After identifying a live and traced variable, the compiler 1000 may update log information in the variables list at operation 1024 and insert logging instructions in the source code at operation 1026. Once all of the logging instructions are inserted in the source code, the source code may be compiled into a binary with logging instructions 1008 (e.g., object code). The binary with logging instructions 1008 may then be used to identify and correct bugs (e.g., errors) in the source code.

For example, in some embodiments, the binary 1008 for the application may be executed by a computer processor. During execution of the application, the processor may execute the logging instructions. Execution of the logging instructions may generate an output which includes information about the state of the application (e.g., information about variables, such as their values) when the application reaches the location of the logging instructions in its execution order or sequence. This output may be analyzed to identify and locate one or more bugs in the source code. For example, the values of variables may be analyzed to determine whether functions are operating properly by comparing the values to expected values. Additionally, by tracking the values of the variables as the application execute (e.g., at discrete points in the execution), a location of the potential software bugs may be identified (e.g., automatically by a processor) by determining a point in the source code (e.g., a set of lines) where the values switch from correct to incorrect. After identifying the potential bug(s) and corresponding location(s), the source code may be corrected (e.g., automatically by the processor or manually by a user) to remove the bugs.

In some embodiments, the back-end 1000B of the compiler 1000 may further include various subcomponents that are not shown in FIG. 10. For example, the back-end 100B may include a logging IR translator, one or more analysis adapters, an analysis information repository, and logging instrumentation. The logging IR translator may be configured to create a dictionary by translating the information for traced variables in the intermediate representation. The analysis adapter(s) may be configured to collect analysis information for traced variables and store the information in the analysis information repository. The logging instrumentation may be configured to instrument the logging statements for the traced variables based on the information in the analysis information repository.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible embodiments of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for detecting bugs in an application, the computer program product comprising a computer readable storage medium having program instructions embodied therewith, the program instructions executable by a processor to cause the processor to perform a method comprising:
   receiving a monitoring configuration file that defines one or more aspects of an application to monitor during execution of the application, wherein the monitoring configuration file includes a scope to be monitored and a variable to be monitored;
   parsing the monitoring configuration file to determine a target object that is to be monitored;
   identifying a plurality of positions of the target object in the source code of the application, wherein identifying the plurality of positions comprises:
      analyzing the source code to identify one or more trace scopes in the source code based on the monitoring configuration file;
      identifying, within at least one trace scope, a plurality of variables that includes a first variable and a second variable;
      determining that the first variable is the variable to be monitored included in the monitoring configuration file;
      determining that the second variable is an alias of the variable to be monitored included in the monitoring configuration file; and
      determining that the plurality of positions includes the positions in the source code that (i) include at least one of the first or second variables, and (ii) are within at least one trace scope;
   analyzing, without executing the source code, one or more lines of code at each of the plurality of positions to determine whether the one or more lines of code at each respective position change a state of the target object;
   determining, based on the analyzing, a first set of positions of the plurality of positions, wherein the first set of positions includes one or more positions having lines of code that change the state of the target object; and
   inserting a logging command at each position of the first set of positions.

2. The computer program product of claim 1, wherein the monitoring configuration file includes a rule that only positions in the source code that will be called during execution of the application are monitored, and wherein determining the first set of positions comprises:
   analyzing the source code to determine that one or more lines of code at a first position of the plurality of positions will not be called during execution of the application; and
   omitting, from the first set of positions, the first position even if the one or more lines of code at the first position change the state of the target object.

3. The computer program product of claim 1, wherein the plurality of positions further includes a second set of positions, wherein the second set of positions includes one or more positions having lines of code that do not change the state of the target object, wherein the method is performed by a compiler, and wherein determining the first set of positions comprises:
   analyzing, by the compiler, the source code to determine whether the target object at a first position of the plurality of positions is alive at the first position, wherein the target object is considered alive at a given position if the target object could be read after the given position and before the target object is modified again; and
   omitting, from the first set of positions, in response to determining that the target object in not alive at the first position, the first position even if the one or more lines of code at the first position change the state of the target object.

4. A method comprising:

receiving a monitoring configuration file that defines one or more aspects of an application to monitor during execution of the application, wherein the monitoring configuration file includes a scope to be monitored and a variable to be monitored;

parsing the monitoring configuration file to determine a target object that is to be monitored;

identifying a plurality of positions of the target object in the source code of the application, wherein identifying the plurality of positions comprises:

analyzing the source code to identify one or more trace scopes in the source code based on the monitoring configuration file;

identifying, within at least one trace scope, a plurality of variables that includes a first variable and a second variable;

determining that the first variable is the variable to be monitored included in the monitoring configuration file;

determining that the second variable is an alias of the variable to be monitored included in the monitoring configuration file; and determining that the plurality of positions includes the positions in the source code that (i) include at least one of the first or second variables, and (ii) are within at least one trace scope;

analyzing, without executing the source code, one or more lines of code at each of the plurality of positions to determine whether the one or more lines of code at each respective position change a state of the target object;

determining, based on the analyzing, a first set of positions of the plurality of positions, wherein the first set of positions includes one or more positions having lines of code that change the state of the target object; and inserting a logging command at each position of the first set of positions.

5. The method of claim 4, wherein the monitoring configuration file includes a rule that only positions in the source code that will be called during execution of the application are monitored, and wherein determining the first set of positions comprises:

analyzing the source code to determine that one or more lines of code at a first position of the plurality of positions will not be called during execution of the application; and omitting, from the first set of positions, the first position even if the one or more lines of code at the first position change the state of the target object.

6. The method of claim 4, wherein the plurality of positions further includes a second set of positions, wherein the second set of positions includes one or more positions having lines of code that do not change the state of the target object, wherein the method is performed by a compiler, and wherein determining the first set of positions comprises:

analyzing, by the compiler, the source code to determine whether the target object at a first position of the plurality of positions is alive at the first position, wherein the target object is considered alive at a given position if the target object could be read after the given position and before the target object is modified again; and omitting, from the first set of positions, in response to determining that the target object in not alive at the first position, the first position even if the one or more lines of code at the first position change the state of the target object.

7. A system comprising:

a computer-readable memory unit; and a processor communicatively coupled to the computer-readable memory unit, the processor being configured to perform a method comprising:

receiving a monitoring configuration file that defines one or more aspects of an application to monitor during execution of the application, wherein the monitoring configuration file includes a scope to be monitored and a variable to be monitored;

parsing the monitoring configuration file to determine a target object that is to be monitored;

identifying a plurality of positions of the target object in the source code of the application, wherein identifying the plurality of positions comprises:

analyzing the source code to identify one or more trace scopes in the source code based on the monitoring configuration file;

identifying, within at least one trace scope, a plurality of variables that includes a first variable and a second variable;

determining that the first variable is the variable to be monitored included in the monitoring configuration file;

determining that the second variable is an alias of the variable to be monitored included in the monitoring configuration file; and determining that the plurality of positions includes the positions in the source code that (i) include at least one of the first or second variables, and (ii) are within at least one trace scope;

analyzing, without executing the source code, one or more lines of code at each of the plurality of positions to determine whether the one or more lines of code at each respective position change a state of the target object;

determining, based on the analyzing, a first set of positions of the plurality of positions, wherein the first set of positions includes one or more positions having lines of code that change the state of the target object; and inserting a logging command at each position of the first set of positions.

8. The system of claim 7, wherein the monitoring configuration file includes a rule that only positions in the source code that will be called during execution of the application are monitored, and wherein determining the first set of positions comprises:

analyzing the source code to determine that one or more lines of code at a first position of the plurality of positions will not be called during execution of the application; and omitting, from the first set of positions, the first position even if the one or more lines of code at the first position change the state of the target object.

9. The system of claim 7, wherein the plurality of positions further includes a second set of positions, wherein the second set of positions includes one or more positions having lines of code that do not change the state of the target object, wherein the method is performed by a compiler, and wherein determining the first set of positions comprises:

analyzing, by the compiler, the source code to determine whether the target object at a first position of the plurality of positions is alive at the first position, wherein the target object is considered alive at a given position if the target object could be read after the given position and before the target object is modified again; and omitting, from the first set of positions, in response to determining that the target object in not alive at the first position, the first position even if the one or more lines of code at the first position change the state of the target object.

* * * * *